United States Patent [19]
Costin

[11] Patent Number: 5,866,516
[45] Date of Patent: Feb. 2, 1999

[54] COMPOSITIONS AND METHODS FOR SOLIDIFYING DRILLING FLUIDS

[76] Inventor: C. Richard Costin, 386 N. Church St., West Chester, Pa. 19380

[21] Appl. No.: 107,536

[22] Filed: Aug. 17, 1993

[51] Int. Cl.$^6$ .................................................. C09K 7/00
[52] U.S. Cl. ............................................ 507/103; 166/295
[58] Field of Search ...................................... 507/100, 103

[56] References Cited

U.S. PATENT DOCUMENTS

| | | | |
|---|---|---|---|
| 2,911,365 | 11/1959 | Burland et al. | 252/8.5 |
| 3,816,308 | 6/1974 | LeBlanc | 252/8.5 A |
| 3,960,988 | 6/1976 | Kent et al. | |
| 4,013,568 | 3/1977 | Fischer et al. | 252/8.5 C |
| 4,087,365 | 5/1978 | Clem | 252/8.5 A |
| 4,632,950 | 12/1986 | Kmiec et al. | |
| 5,058,679 | 10/1991 | Hale et al. | 166/293 |
| 5,159,035 | 10/1992 | Evani et al. | |

*Primary Examiner*—Gary Geist
*Attorney, Agent, or Firm*—Michael B. Fein; Schnader Harrison Segal & Lewis, LLP

[57] ABSTRACT

Drilling fluid composition adapted for solidification in a borehole and method for solidifying a drilling fluid in a borehole are provided. The drilling fluid composition comprises (1) a drilling fluid, (2) a crosslinking-effective amount of at least one reactive monomer wherein the at least one reactive monomer is a metal salt of an $\alpha, \beta$-ethylenically unsaturated carboxylic acid, a monomethacrylic acid metal salt, an aromatic acid acrylate, an aromatic acid methacrylate, or mixtures thereof, and (3) a polymerization initiator.

21 Claims, No Drawings

COMPOSITIONS AND METHODS FOR SOLIDIFYING DRILLING FLUIDS

FIELD OF INVENTION

The present invention relates to drilling fluid compositions and methods and, in particular, to drilling fluid compositions and methods in which reactive monomers are utilized to solidify the drilling fluid within a borehole.

BACKGROUND OF THE INVENTION

It is well known to utilize drilling fluids, or drilling muds, in the drilling of oil, gas, and water wells. Typically, the drilling fluid is recirculated down through a hollow drill pipe, across the face of the drill bit and upward through the borehole. The drilling fluid serves multiple functions including transporting borehole cuttings to the surface, preventing the entry of formation fluids into the borehole, sealing the walls of the hole, cooling and lubricating the drill bit and stem, and providing a medium for hydraulic power for bottomhole cleaning. As the drilling mud is recirculated a deposit of the fluid, the drilling fluid filter cake, is deposited along the borehole walls.

After the borehole has been drilled, a casing is run into the well and cemented into place by pumping cement into the casing, displacing the cement into the annulus between the casing and borehole wall with drilling fluid or water, and allowing the cement to harden. The effectiveness of the seal formed by the cement between the casing and borehole surfaces is dependent upon the bonding of the cement to the casing and borehole surfaces.

There are a number of inherent disadvantages in the conventional method of cementing the casing in the borehole. First, the drilling fluid utilized during drilling must be removed from the borehole prior to introducing cement into the casing. Further, the effectiveness of the seal between the casing and the borehole surfaces can be adversely affected by the drilling fluid filter cake. Therefore, a need exists for a more efficient means for cementing the casing within the borehole and a more effective means for sealing the casing with the borehole surfaces.

SUMMARY OF THE INVENTION

The present invention provides drilling fluid compositions, and methods, for solidification of drilling fluids within a borehole. It has been discovered that solidification may be achieved through the addition of a reactive monomer, or monomers, to a drilling fluid. A polymerization initiator is subsequently added to the drilling fluid containing the reactive monomer and the drilling fluid composition is displaced into a selected location within a borehole and cured.

DESCRIPTION OF THE PREFERRED EMBODIMENTS

By "drilling fluid", as used herein, is meant waterbased drilling mud, including but not limited to, spud mud, natural mud, chemically treated mud, and saltwater mud. Such drilling fluid has continuous and dispersed phases and is substantially hydrocarbon free. The continuous water phase may be fresh water, brackish water, brine water, seawater or other water containing fluid. The dispersed phase may be clay, shale, barite or any other solid conventionally utilized. Additionally, the drilling fluid may contain any of a variety of well known additives and dispersants utilized by those skilled in the art to enhance desired fluid properties. Exemplary additives and dispersants include, but are not limited to, phosphates, lignosulfonates, calcium compounds, quebracho, polymers, copolymers, and various metal salts.

The present invention is based on the discovery that the incorporation of a reactive monomer, or monomers, into a drilling fluid and the subsequent polymerization of the monomer provides a relatively impermeable consolidated body to be formed from the drilling fluid. The resultant solidified mass of drilling fluid can be used in place of the cement utilized in conventional well drilling methods to cement a casing within the borehole.

One type of reactive monomer that may be utilized in the present invention is the metal salt of certain α, β-ethylenically unsaturated carboxylic acids, specifically the metal salts of acrylic and methacrylic acids. The metal component of the unsaturated carboxylic acid metal salt may include, without limitation, magnesium, calcium, iron, sodium, potassium, aluminum, and zinc. The preferred metals are magnesium, calcium, iron, aluminum, and zinc. Zinc is particularly preferred.

The unsaturated carboxylic acid metal salts that may be utilized in the present invention correspond to the general structural formula shown in Formula 1 below:

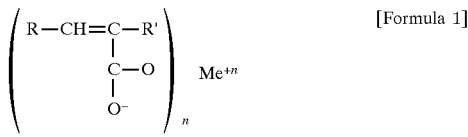

[Formula 1]

in which R and R' are independently selected from the group consisting of hydrogen, hydroxyl, alkyl, alkenyl, alkynl, aryl, aralkyl, and alkaryl, Me is a metal atom selected from the above-listed metals and n is an integer from 1 to 6.

The preferred metal salts are zinc diacrylate and zinc dimethacrylate. These metal salts are water soluble, or dispersable, and are compatible with the other inorganic components conventionally utilized in drilling fluids. Additionally, both zinc diacrylate and zinc dimethacrylate are advantageous because they may contribute to the high density requirement of drilling fluids and will provide good adhesion between the casing and borehole rock formation surfaces.

In addition to the di(meth)acrylic acid metal salts, the monomethacrylic acid salts of certain metals may be utilized as the reactive monomer in the compositions and methods of the present invention. The preferred monomethacrylate is zinc monomethacrylate. Both the di(meth)acrylic acid metal salts and the monomethacrylic acid metal salts are well known and commercially available.

Still further types of monomers that may be utilized as the reactive monomer in the compositions and methods of the present invention are aromatic acid (meth)acrylates. The aromatic acid (meth)acrylates useful in the present invention contain a high degree of carboxyl, anhydride, and reactive ester functional groups. These aromatic acid (meth)acrylates and their preparation are described in U.S. Pat. Nos. 4,722,947 and 4,745,138 to Thanwalla et al. which are incorporated in their entirety herein by reference. The preferred aromatic acid (meth)acrylate is one of sufficiently high acid number to permit solubility in aqueous alkaline mediums. The aromatic acid (meth)acrylates may additionally function as dispersants to maintain the fluidity of the drilling fluid prior to polymerization of these monomers by the addition of a polymerization initiator.

The reactive monomers may be used singly or in combination. The preferred reactive monomer is zinc diacrylate. The amount of the reactive monomer, or monomers, to be used is a crosslinking-effective amount or, in other words, an amount that is sufficient upon crosslinking to solidify the drilling fluid in situ and secure the drill pipe in its position in the borehole. The lower limit of the amount of reactive monomer that may be used is calculated based on the amount and surface area of the dispersed phase solids and additives in the drilling fluid. The amount must be sufficient to form a solidified drilling fluid mass upon crosslinking. The amount used preferably does not exceed the solubility of the reactive monomer in water. If an amount that exceeds the solubility limit is utilized, no benefit to polymerization will be observed. However, the excess monomer may provide additional benefits, i.e., improved fluid viscosity.

If the reactive monomer utilized is an $\alpha$, $\beta$-ethylenically unsaturated carboxylic acid metal salt, the monomer may be incorporated into the drilling fluid by using the metal salts of the unsaturated carboxylic acid obtained by reacting the metal compound and the unsaturated carboxylic acid. Alternatively, the unsaturated carboxylic acid and the metal compound, i.e., metal oxide, metal hydroxide, metal carbonate and the like may be added into the drilling fluid and reacted to form the metal salts in situ.

Polymerization of the reactive monomer, or monomers, is initiated by the addition of a water soluble polymerization initiator. Any of a variety of the well known water soluble polymerization initiators may be utilized. Examples of such initiators include the redox initiators comprising a reducing agent, such as a sulfite or bisulfite of an alkali metal, ammonium sulfite or ammonium bisulfite, and an initiator, such as an alkali metal or ammonium persulfate or alkali metal or ammonium thiosulfate, in combination with the reducing agent. Alternatively, an alkali metal of persulfate or ammonium persulfate may be used alone as a thermal initiator.

Tertiary alkyl hydroperoxides may also be utilized as polymerization initiators in the compositions and methods of the present invention. Exemplary hydroperoxides include 2,5-dihydroperoxy-2,5-dimethylhexane, tertiarybutyl hydroperoxide, and tertiaryamyl hydroperoxide and cumene hydroperoxide.

Other suitable polymerization initiators useful in the compositions and methods of the invention include azo initiators. Exemplary azo initiators include 2,2'-azobis(2-amidinopropane)dihydrochloride, 2,2'-azobis(4-methoxy-2, 4-dimethylvaleronitrile), 4,4'-azobis(4-cyanovaleric acid), 2,2-azobis(methyl isobutyrate), 2,2'-azobis(N,N'-dimethylene isobutyramidine) dihydorchloride, 2,2'-azobis [2-2(2-imidazolin-2-yl)propane], 2,2'-azobis[2-methyl-N-(2-hydroxyethyl)-propionamide], and 1,1'-azobis (cyclohexane-1-carbonitrile).

The initiators can be used singly or in any suitable combination. The amount of initiator used is an amount effective to cure the reactive monomer or monomers. More specifically, the amount of polymerization initiator is calculated as solids, of between 0.1% to 10%, preferably between 0.5% to 5.0% of the weight of the reactive monomer, or monomers. The preferred teritary alkyl hydroperoxide initiator is tertiarybutyl peroxide and the preferred redox initiator is ammonium persulfate/sodium bisulfite.

Any water-based drilling fluid may be utilized in the compositions and methods of the present invention. Exemplary drilling fluids include high lime fluids (about 2.0 to about 15 pounds of excess lime per barrel of drilling fluid), low lime fluids (about 0.5 to about 3.0 pounds of excess lime per barrel of drilling fluid), low lime-salt-alcohol fluid (about 1 to about 3.0 pounds of excess lime, about 18 to about 109 pounds of salt, about 1 to about 158 pounds of alcohol per barrel of drilling fluid), sea-water-lignosulfonate fluids, seawater-gypsum fluids, sodium chloride-partially hydrolyzed polyacrylamide fluids, and fresh water-salt-partially hydrolyzed polyacrylamide fluids. Preferably, lime drilling fluids are utilized because these fluids provide good solidification of the filter cake deposits during recirculation. The non-lime based drilling fluids may be converted to lime-based fluids by the addition of between one to ten pounds of lime per barrel of fluid. A viscosity reducer, in an amount of between one to ten pounds per barrel of fluid, may also be required.

The reactive monomer, or monomers, may be added to the drilling fluid prior to, or during the use of the drilling fluid in recirculation. The polymerization initiator may be added to the drilling fluid containing the reactive monomer or monomers shortly before, during, or following placement of the casing within the borehole. The drilling fluid containing the reactive monomer and polymerization initiator is then pumped into the casing, displaced by conventional methods to a location selected so that the cured drilling fluid composition functions to cement the casing in position, and allowed to cure. The time to cure is dependent on drilling fluid temperature and the polymerization initiator utilized. Generally, the curing time is between five minutes and three days.

Other embodiments of the invention will be apparent to those skilled in the art from a consideration of this specification or practice of the invention disclosed herein. It is intended that the specification be considered as exemplary only, with the true scope and spirit of the invention being indicated in the following claims.

What is claimed is:

1. A drilling fluid composition adapted for solidification in a borehole, the drilling fluid composition comprising:

(a) a drilling fluid;

(b) a crosslinking-effective amount of at least one reactive monomer; and (c) a cure-effective amount of a polymerization initiator.

2. The composition of claim 1, wherein the at least one reactive monomer is a metal salt of an $\alpha$, $\beta$-ethylenically unsaturated carboxylic acid, a monomethacrylic acid metal salt, an aromatic acid acrylate, an aromatic acid methacrylate, or mixtures thereof.

3. The composition of claim 2, wherein the metal salt of the $\alpha$, $\beta$-ethylenically unsaturated carboxylic acid is a metal salt of acrylic acid.

4. The composition of claim 3, wherein the metal salt of acrylic acid is calcium diacrylate, magnesium diacrylate, iron diacrylate, aluminum diacrylate or zinc diacrylate.

5. The composition of claim 4, wherein the metal salt of acrylic acid is zinc diacrylate.

6. The composition of claim 2, wherein the metal salt of the $\alpha$, $\beta$-ethylenically unsaturated carboxylic acid is a metal salt of methacrylic acid.

7. The composition of claim 6, wherein the metal salt of methacrylic acid is calcium dimethacrylate, magnesium dimethacrylate, iron dimethacrylate, aluminum dimethacrylate, or zinc dimethacrylate.

8. The composition of claim 7, wherein the metal salt of methacrylic acid is zinc dimethacrylate.

9. The composition of claim 2, wherein the monomethacrylic acid metal salt is zinc monomethacrylate.

10. The composition of claim 1, wherein the polymerization initiator is a redox initiator, a thermal initiator, a tertiary alkyl hydroperoxide initiator, an azo initiator, or mixtures thereof.

11. The composition of claim 10, wherein the polymerization initiator is a tertiary alkyl hydroperoxide initiator.

12. A method for solidifying a drilling fluid in a borehole, comprising the steps of:
   (a) providing a drilling fluid composition comprising a drilling fluid and a crosslinking-effective amount of at least one reactive monomer;
   (b) subsequently adding a cure-effective amount of a polymerization initiator into the composition;
   (c) displacing the composition into a selected location in the borehole; and
   (d) curing the drilling fluid.

13. The method of claim 12, wherein the at least one reactive monomer is a metal salt of an $\alpha$ $\beta$-ethylenically unsaturated carboxylic acid, a monomethacrylic acid metal salt, an aromatic acid acrylate, an aromatic acid methacrylate, or mixtures thereof.

14. The method of claim 13, wherein the metal salt of the $\alpha$ $\beta$-ethylenically unsaturated carboxylic acid is a metal salt of acrylic acid or a metal salt of methacrylic acid.

15. The method of claim 14, wherein the metal salt of acrylic acid is calcium diacrylate, magnesium diacrylate, iron diacrylate, aluminum diacrylate, or zinc diacrylate.

16. The method of claim 15, wherein the metal salt of acrylic acid is zinc diacrylate.

17. The method of claim 14, wherein the metal salt of methacrylic acid is calcium dimethacrylate, magnesium dimethacrylate, iron dimethacrylate, aluminum dimethacrylate, or zinc dimethacrylate.

18. The method claim 17, wherein the metal salt of methacrylic acid is zinc dimethacrylate.

19. The method of claim 13, wherein the monomethacrylic acid metal salt is zinc monomethacrylate.

20. The method of claim 12, wherein the polymerization initiator is a redox initiator, a thermal initiator, a tertiary alkyl hydroperoxide initiator an azo initiator, or mixtures thereof.

21. The method of claim 12, wherein the polymerization initiator is a tertiary alkyl hydroperoxide initiator.

* * * * *

UNITED STATES PATENT AND TRADEMARK OFFICE
CERTIFICATE OF CORRECTION

PATENT NO. : 5,866,516
DATED : February 2, 1999
INVENTOR(S) : C. Richard Costin

It is certified that error appears in the above-identified patent and that said Letters Patent is hereby corrected as shown below:

At Column 2, line 25, change

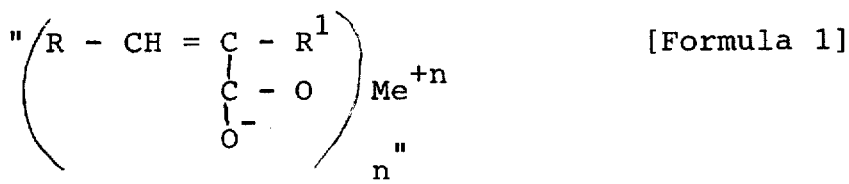 [Formula 1]

to

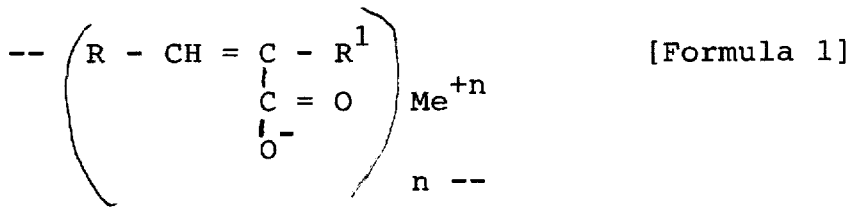 [Formula 1]

Signed and Sealed this

Twenty-first Day of September, 1999

Q. TODD DICKINSON

*Attest:*

*Attesting Officer*  *Acting Commissioner of Patents and Trademarks*